United States Patent

Shimokobe et al.

[11] Patent Number: 6,036,160
[45] Date of Patent: Mar. 14, 2000

[54] REARVIEW MIRROR SUPPORT STRUCTURE

[75] Inventors: Keikichi Shimokobe; Yoshiteru Kinoshita; Kunihiro Osada; Osamu Sato, all of Saitama, Japan

[73] Assignee: Honda Giken Kogyo Kabushiki Kaisha, Tokyo, Japan

[21] Appl. No.: 08/978,144

[22] Filed: Nov. 25, 1997

[30] Foreign Application Priority Data

Nov. 28, 1996 [JP] Japan ................................. 8-317710

[51] Int. Cl.[7] .................................................. A47G 1/24
[52] U.S. Cl. ........................................ 248/483; 248/549
[58] Field of Search .................................. 248/460, 461, 248/462, 466, 468, 458, 476, 483, 488, 549, 447, 27.1, 27.3; 359/872; 350/604

[56] References Cited

U.S. PATENT DOCUMENTS

| 2,701,113 | 2/1955 | Koonter | 248/483 |
|---|---|---|---|
| 2,856,815 | 10/1958 | Ross | 248/483 |
| 3,434,688 | 3/1969 | Engelmann | 248/483 |
| 3,512,746 | 5/1970 | Vitaloni et al. | 248/483 |
| 3,638,899 | 2/1972 | Bonisch et al. | 248/483 |
| 4,258,894 | 3/1981 | Niggermann | 248/483 |
| 4,357,076 | 11/1982 | Manzoni | 350/307 |
| 4,523,736 | 6/1985 | Manzoni | 248/483 |
| 4,606,619 | 8/1986 | Yamana | 350/604 |
| 4,824,065 | 4/1989 | Manzoni . | |
| 5,621,577 | 4/1997 | Lang et al. | 359/872 |
| 5,629,810 | 5/1997 | Perry et al. | 359/872 |
| 5,684,488 | 11/1997 | Liautaud et al. | 342/20 |

FOREIGN PATENT DOCUMENTS

| 471727 | 2/1951 | Canada | 248/483 |
|---|---|---|---|
| 500055 | 2/1954 | Canada | 248/483 |
| 0064335 | 11/1982 | European Pat. Off. . | |
| 2431335 | 1/1976 | Germany | 248/843 |
| 51-25316 | 6/1976 | Japan . | |
| Y2-58-28917 | 6/1983 | Japan . | |

*Primary Examiner*—Ramon O. Ramirez
*Assistant Examiner*—Tan Le
*Attorney, Agent, or Firm*—Birch, Stewart, Kolasch & Birch, LLP

[57] ABSTRACT

A support structure for a motorcycle's rearview mirror is constructed so as to dampen any vibrations which would normally be transmitted to the rearview mirror, and to reduce the risk of rattling noises in the rearview mirror assembly. The support structure includes a mirror stay, in the form of an elongated tubular extension, which serves to distance the rearview mirror from the motorcycle. One end of the mirror stay is connected to the motorcycle through a mirror stay supporting structure, which allows the mirror stay to rotate within a limited range. A rearview mirror housing is connected to the other end of the mirror stay. The connection between the mirror stay and the rearview mirror housing is accomplished by a rearview mirror main body supporting structure. The rearview mirror main body supporting structure allows the mirror housing to assume various orientations relative to the mirror stay. The rearview mirror main body supporting structure is characterized by two engaging spherical surfaces which are spring biased toward each other, and which may be adjusted relative to each other. The two surfaces ensure a stable, adjustable connection between the mirror housing and the mirror stay.

20 Claims, 6 Drawing Sheets

REARVIEW MIRROR SUPPORT STRUCTURE

BACKGROUND OF THE INVENTION

1. Field of the Invention

The present invention relates to a motorcycle's rearview mirror support structure.

2. Description of Background Art

Support structures for a motorcycle's rearview mirror are known. For example, Laid-open Japanese Patent No. Sho 51-25316, titled "A Safe Rearview Mirror," and Laid-open Japanese Patent No. Sho 58-28917, titled "A Structure for Supporting Rearview Mirror of a Vehicle" describe rearview mirror support structures. The rearview mirror support structures of these two Japanese Patents are similar to the support structure illustrated in FIGS. 5(a) and 6(a), which will be described in greater detail later in the specification. However, for purposes of an introduction to the background art, the two Japanese Patents will be briefly described.

Japanese Patent No. Sho 51-25316 shows a half-spherically convex portion of a case 5 engaged with a half-spherically concave portion of an fitting leg 1. A pressure is applied by a spring 3, through a half-spherical body 2, from the inner side of the half-spherically convex portion, so as to rotatably attach the case 5 to the fitting leg 1. The attachment is made by a screw 4. A mirror 6 is fixed to the case 5.

In this rearview mirror, a spring bracket surface for the spring 3 is provided on the half-spherical body 2. The spring bracket surface is planar. Because the spring bracket surface is planar, the pressure of the spring 3 is not applied uniformly till the end of the half-spherically convex portion of the case 5. As a result, the mirror 6 may vibrate. Further, when the case 5 is moved in order to adjust the mirror 6, the rearview mirror may rattle, depending upon the rotational position of the case 5.

Japanese Patent No. Sho 58-28917 shows a spherical supported portion 15 of a main body M of a rearview mirror as being exposed to a stay seat 3 of a stay 1 for supporting the rearview mirror through a lower elastic body 4. The main body M of the rearview mirror is rotatably held on the inner surface of the spherical supported portion 15 by a pressing force of a compression spring 13 through an upper elastic body 5 and a spring bracket 6.

A drawback results from the lower elastic body 4 being sandwiched between the stay seat 3, which is used as a sliding surface, and the spherical supported portion 15. When the main body M of the rearview mirror is adjusted by an operator of the motorcycle, the sliding between the stay seat 3 and the spherical supported portion 15 is not smooth. A

SUMMARY AND OBJECTS OF THE INVENTION

Accordingly, it is an object of the present invention to provide a rearview mirror supporting structure that allows the main body of the rearview mirror to be smoothly adjusted.

It is another object of the present invention to provide a rearview mirror supporting structure that is stable and will thus hold the adjustment angle of the rearview mirror.

It is a further object of the present invention to provide a rearview mirror supporting structure which avoids vibration and rattling in the rearview mirror.

These and other objects of the present invention are fulfilled by providing an apparatus for supporting a rearview mirror comprising: a first member; a spherically concave portion provided on said first member; a second member; a spherically convex portion provided on said second member, said spherically convex portion engaging said spherically concave portion; a first hole formed in said spherically convex portion; a bracket located inside said spherically convex portion; a second hole formed in said bracket; an extension extending from said spherically concave portion and passing through said first hole and said second hole; a biasing device engaged to said extension; and a seat adapted to slidingly engage against said bracket, said biasing device causing said seat to bear against said bracket and causing said spherically convex portion to bear against said spherically concave portion.

These and other objects of the present invention are also fulfilled by providing an apparatus for supporting a rearview mirror comprising: a stay for attachment to a vehicle; a spherically concave portion formed in said stay; a housing for a rearview mirror; a spherically convex portion attached to said housing, said spherically convex portion having a radius of curvature which is equal to a radius of curvature of said spherically concave portion, and said spherically convex portion engaging said spherically concave portion; a first hole formed in said spherically convex portion; a spring bracket located inside said spherically convex portion; a second hole formed in said spring bracket; an bolt extending from said spherically concave portion and passing through said first hole and said second hole; a spring encircling said bolt; and a spring seat adapted to slidingly engage against said spring bracket, said spring pressing against said spring seat causing said spring seat to bear against said spring bracket and causing said spherically convex portion to bear against said spherically concave portion.

These and other objects of the present invention are also fulfilled by providing an apparatus for supporting a rearview mirror comprising: a first member; a guide formed in said first member; a bushing disposed in said guide; a second member; a concave portion formed in said second member, said first member being located inside said concave portion; a fixing device passing through said bushing and connecting to said first member to said second member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
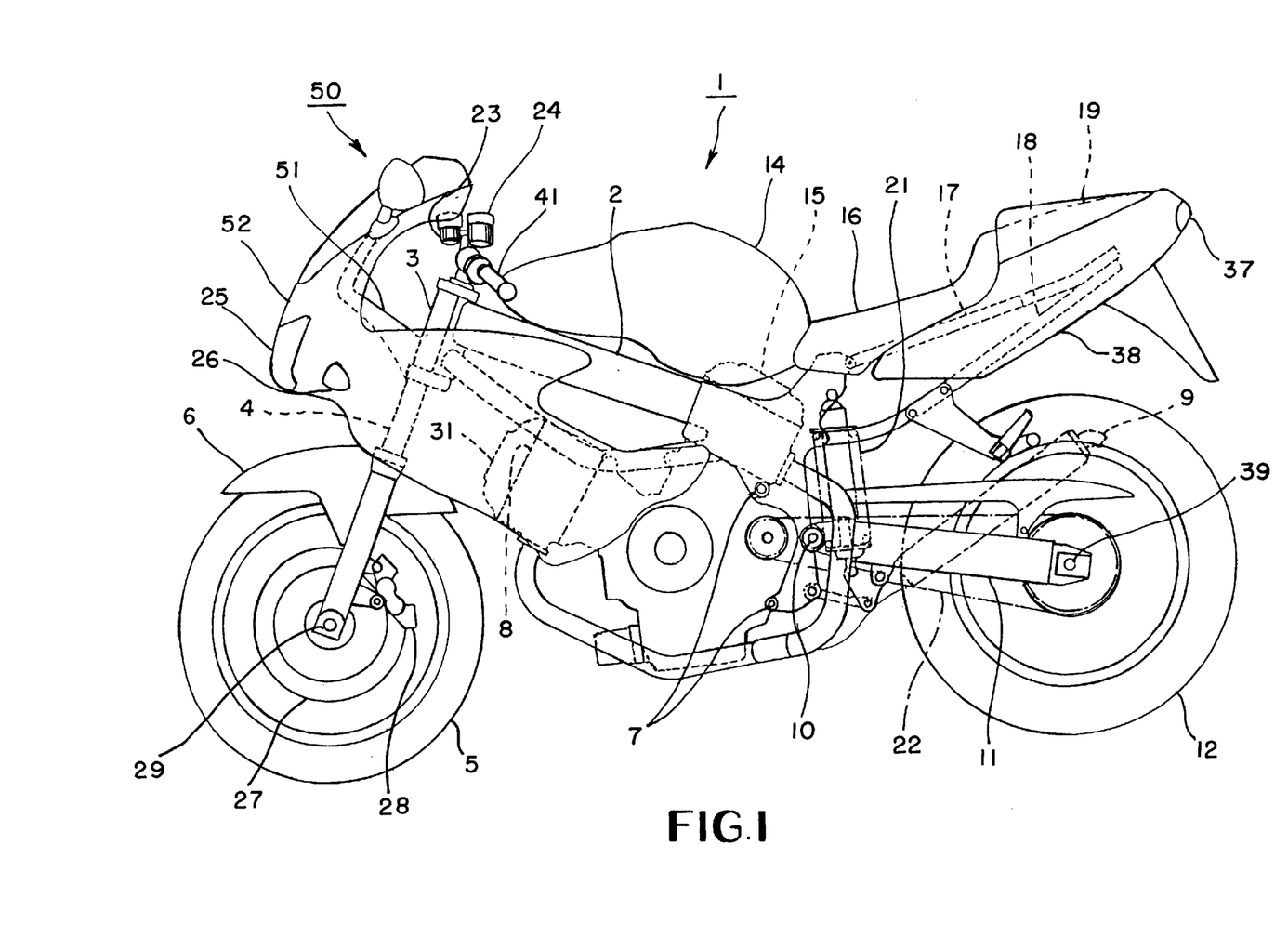
FIG. 1 is a side view of a motorcycle having a rearview mirror porting structure according to the present invention.

FIG. 1 illustrates a motorcycle 1 having a main frame 2. The main frame 2 includes a head pipe 3 which supports a front fork 4. A front axle 29 and a front fender 6 are provided on the front fork 4. The front axle 29 supports a front wheel 5. A brake disc 27 and a caliper 28 are provided for braking the front wheel 5.

The upper portion of the front fork 4 is surrounded by a fairing 52. A head light 25 is located in a front central region of the fairing 52, and air ducts 26 are located in side regions of the fairing 52. The upper portion of the front fork 4 supports a steering handle 41. A brake oil cup 23 and a clutch oil cup 24 are attached to the steering handle 41. A rearview mirror and a supporting structure for the rearview mirror are generally indicated by reference numeral 50. The rearview mirror and its supporting structure 50 will be explained in greater detail with reference to FIGS. 2–6(b), below.

The motorcycle 1 also includes a fuel tank 14, a driver's seat 16, a passenger's seat 19, and seat rails 17 and 18 for supporting the driver's seat and passenger's seat. A seat cowling 38 surrounds the seat rails 17 and 18. A tail light 37 is located in a rear, central region of the seat cowling 38.

A V-type engine 8 is installed beneath the main frame 2 using a pair of engine hangers 7. A rear head cover 15 is installed over a rear head of the V-type engine 8, and a front head cover 31 is installed over a front head of the V-type engine 8. An exhaust pipe 9 extends from the V-type engine 8.

Near a rear of the V-type engine 8, a swing arm 11 is pivotally supported on a shaft 10. A rear suspension 21 connects the swing arm 11 to a portion of the main frame 2. A rear axle 39 is installed on the swing arm 11. The rear axle 39 supports a rear wheel 12. A drive chain 22 transmits power from the V-type engine 8 to the rear wheel 12.

Figure 2:
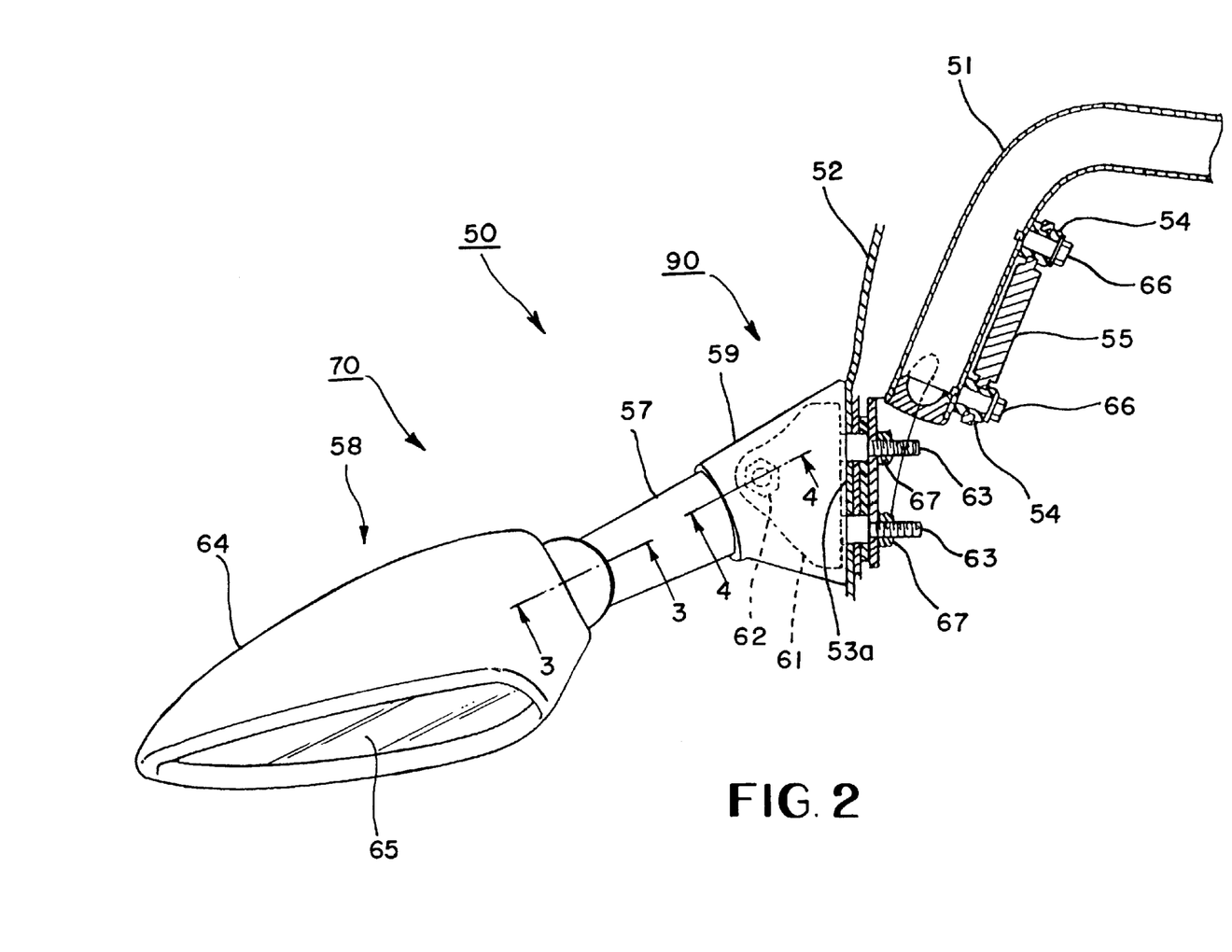
FIG. 2 is an overhead view in partial cross section illustrating the attachment of a base of the rearview mirror supporting structure to the motorcycle.

FIG. 2 illustrates the component parts of the rear view mirror and the rearview mirror supporting structure 50. A rearview mirror main body 58 includes a housing 64 and a mirror 65. A mirror stay 57 is formed as a tubular extension for locating the rearview mirror main body 58 a predetermined distance away from the fairing 52. A rearview mirror main body supporting structure 70 will be discussed in detail with reference to FIG. 3. A mirror stay supporting structure 90 will be discussed in detail with reference to FIG. 4.

As illustrated in FIG. 2, a fairing stay 51 is disposed inside the fairing 52. The fairing stay 51 serves to support the fairing 52 and the mirror stay supporting structure 90. The fairing stay 51 includes a pair of elastic members 54 and a vibration isolating weight 55 supported between the elastic members 54. The pair of elastic members 54 are attached to the fairing stay 51 by fastening devices 66.

Now, the connection between the mirror stay supporting structure 90 and the fairing stay 51 will be discussed. The mirror stay supporting structure 90 includes a mirror base main body 61 which is connected to the mirror stay 57 by a first bolt 62. A boot 59 covers the mirror base main body 61 in order to improve the appearance of the interface 53a between the mirror stay supporting structure 90 and the fairing 52.

The base main body 61 includes a pair of bolts 63. The pair of bolts 63 may be integrally formed with the base main body 61, welded thereto, threaded therein, or attached by any other suitable means for permanent or semi-permanent attachment. The pair of bolts 63 are passed through holes provided in the fairing 52 and holes provided in an extension portion of the fairing stay 51. A pair of fastening nuts 67 are threadably engaged with the pair of bolts 63 in order to secure the mirror stay supporting structure 90 to the fairing stay 51.

Figure 4:
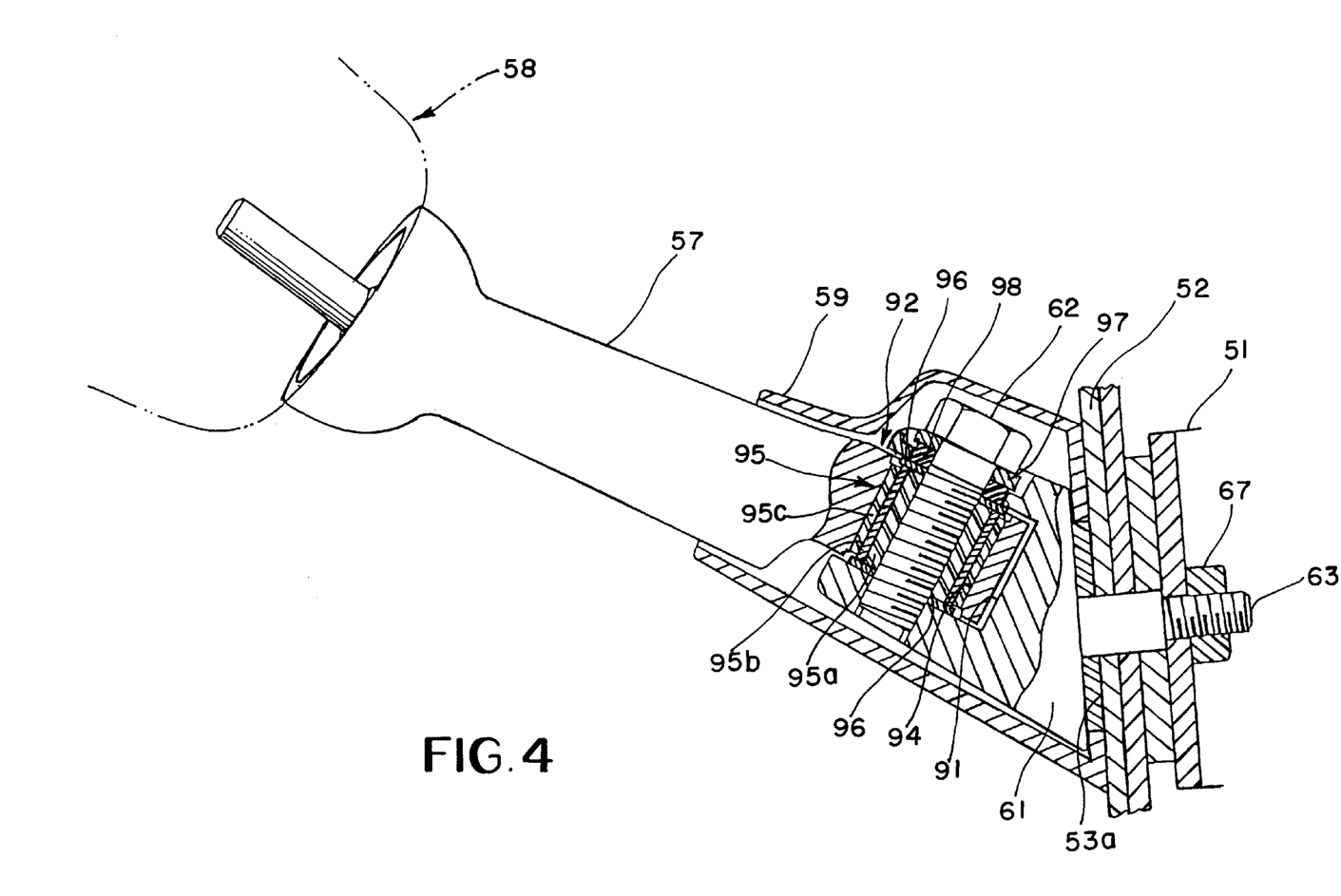
FIG. 4 is a cross sectional view taken along line 4—4 of FIG. 2 which illustrates the connection between the mirror stay and the base.

FIG. 4 is a cross sectional view taken along line 4—4 of FIG. 2. FIG. 4 illustrates the details of the mirror base main body 61 of the mirror stay supporting structure 90. The mirror base main body 61 includes a concave portion 91. A fitting portion 92 of the mirror stay 57 is received inside the concave portion 91. The bolt 62 secures the mirror stay 57 to the mirror base main body 61, while allowing for limited rotation of the mirror stay 57 about the bolt 62.

Now, the particulars of the connection between the fitting portion 92 of the mirror stay 57 and the mirror base main body 61 which allows for the limited rotation will be explained. The fitting portion 92 includes a through hole 94 having a diameter larger than a diameter of the bolt 62. A bushing 95 is entrapped in the through hole 94. The bushing 95 includes an inner pipe 95a, an elastic lining 95b covering the inner pipe 95a, and an outer pipe 95c covering the elastic lining 95b.

As illustrated in FIG. 4, an upper flat washer 96, a spring washer 97 and a hexagonal washer 98 are sandwiched between a head of the bolt 62 and a top of the bushing 95. The hexagonal washer 98 is engaged with walls of the mirror base main body 61, so as to prevent rotation of the hexagonal washer 98 relative to the mirror base main body 61. A lower flat washer 96 is sandwiched between the mirror base main body 61 and a bottom of the bushing 95.

By attaching the mirror stay 57 to the mirror base main body 61, in the manner described above, the mirror stay 57 is rotatable relative to the mirror base main body to a limited extent. Further, any vibration in the fairing stay 51 is reduced or dampened before reaching the mirror stay 57. As a result, vibrations are not readily propagated to the mirror 65. Reduced vibrations in the mirror 65 is a very advantageous result, since it is difficult to see, make judgements about, or even recognize objects in a vibrating mirror. Therefore, from a safety standpoint, the reduction of mirror vibrations is quite desirable.

Figure 3:
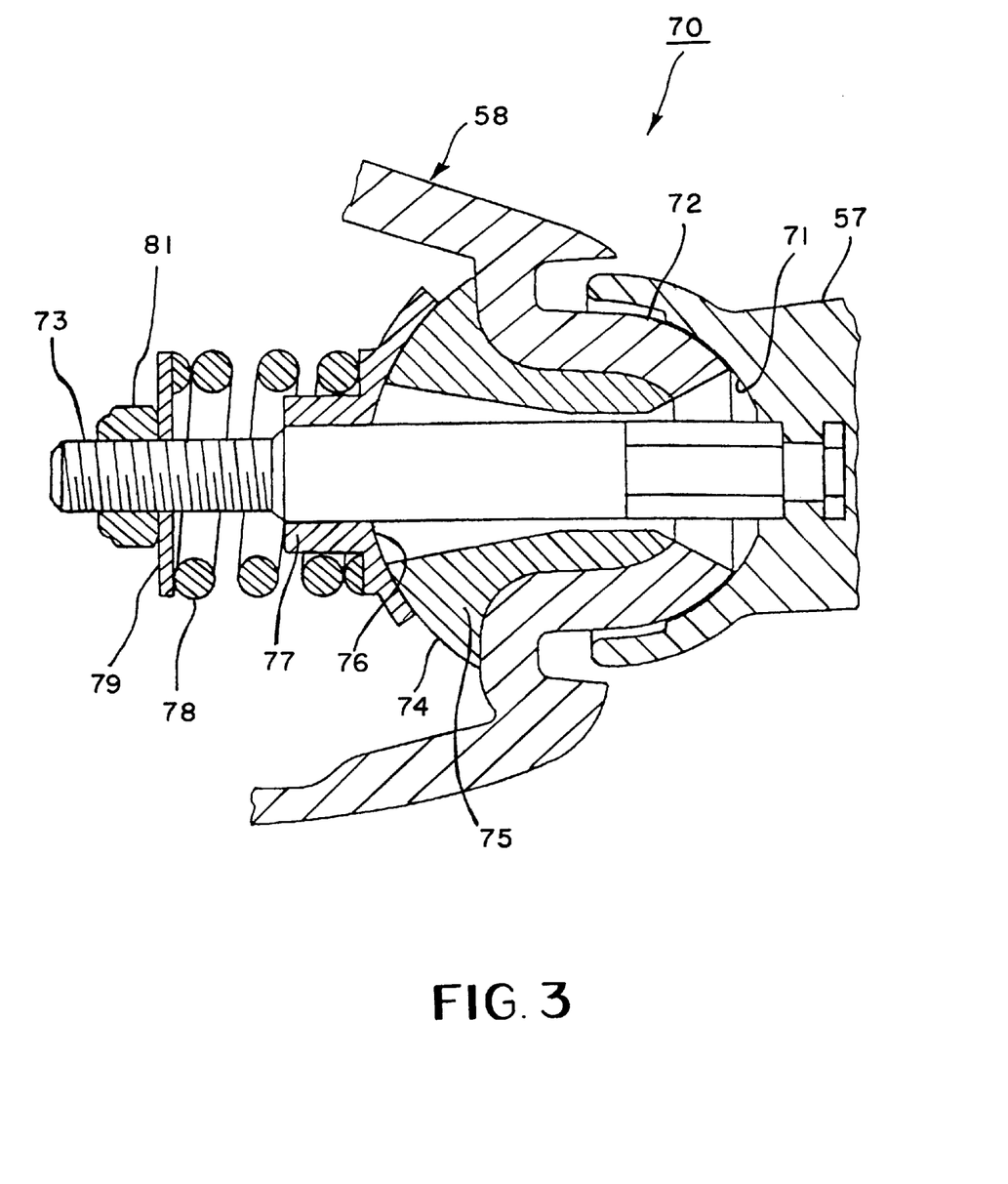
FIG. 3 is a cross sectional view taken along line 3—3 of FIG. 2 which illustrates the connection between a mirror main body and a mirror stay.

Now, the rearview mirror main body supporting structure 70 will be discussed. The rearview mirror main body supporting structure 70 is installed on the mirror stay 57, and allows the housing 64 to move about the mirror stay 57 with a high degree of freedom.

As illustrated in FIG. 3, the rearview mirror supporting structure 70 includes a spherically concave portion 71 provided on an end of the mirror stay 57. A spherically convex portion 72 of the rearview mirror main body 58 engages with the spherically concave portion 71. The spherically convex portion 72 includes a through hole.

A bolt 73 is provided as an extension of the end of the mirror stay 57. The bolt 73 extends from a central region of the spherically concave portion 71 provided on the end of the mirror stay 57. The bolt 73 passes through the through hole in the spherically convex portion 72, and into an inside of the rearview mirror main body 58.

A spring bracket member 75, made of resin, is provided inside the spherically convex portion 72 of the rearview mirror main body 58. The spring bracket member 75 surrounds the through hole formed in the spherically convex portion 72, and thereby surround the bolt 73. A spherically convex surface 74 of the spring bracket 75 faces away from the mirror stay 57. The spherically convex surface 74 serves as a spring bracket surface.

A spring seat 77 includes a spherically concave surface 76. The spherically concave surface 76 has the same radius of curvature as the spherically convex surface 74. The spherically concave surface 76 is slidably engaged against the spherically convex surface 74. The spherically convex surface 74 includes a through hole which is aligned with the through hole of the spring bracket member 75, and has the bolt 73 passing therethrough, when the spherically concave surface 76 is slidably engaged against the spherically convex surface 74.

A spring 78 rests upon a collar on the backside of the spring seat 77. The spring 78 encircles the bolt 73. A spring retaining washer 79 is inserted over the bolt 73. the spring 78 also rests against the spring retaining washer 79. Finally, a spring retaining nut 81 is threadably engaged with the bolt 73. Threading the spring retaining nut 81 onto the bolt 73 causes the spring 78 to be compressed between the spring seat 77 and the spring retaining washer 79.

The spring seat 77 is made using a die-casting process. As mentioned above, the spring bracket member 75 is made of resin. The spring bracket member 75 is a separately formed body, apart from the rearview mirror main body 58, and is attached to the rearview mirror main body 58 during assembly. By separately forming the spring bracket member 75, the rearview mirror main body 58 can be formed of any desirable material. Therefore, the appearance of the rearview mirror main body 58 can be improved. Also, the manufacturing costs can be reduced.

The operation and features of the present invention's rearview mirror main body supporting structure 70 will be described in comparison to the background art's rearview mirror main body supporting structure, by making reference to FIGS. 5(a), 5(b), 6(a) and 6(b).

Figure 5A:
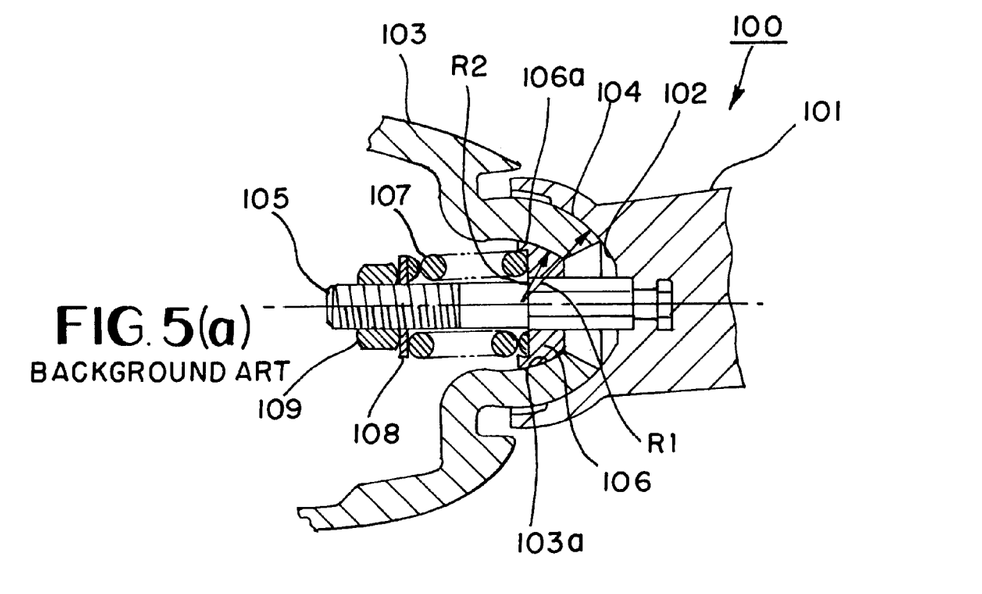
FIG. 5(a) is a cross sectional view illustrating the connection between the mirror main body and the mirror stay of a rearview mirror supporting structure according to the background art, when the mirror main body is in a non-tilted condition relative to the mirror stay.

FIG. 5(a) illustrates the background art's rearview mirror main body supporting structure 100. The background art's rearview mirror main body supporting structure 100 includes a mirror stay 101 and a rearview mirror main body 103. A spherically concave portion 102 is provided on the mirror stay 101. A spherically convex portion 104 is provided on the rearview mirror main body 103, and is engaged with the spherically concave portion 102. A bolt 105 passes through the spherically convex portion 104 from the spherically concave portion 102 to the inside of the rearview mirror main body 103.

The background art's rearview mirror main body supporting structure 100 further includes a spring bracket member 106 provided inside the rearview mirror main body 103. A spring 107 encircles the bolt 105 and applies a pressure to the spring bracket member 106, so as to press the spherically convex portion 104 against the spherically concave portion 102. A washer 108 and a nut 109 engage with the bolt 105 for holding the spring 107.

As shown in FIG. 5(a), R1 is the inner radius of the spherically convex portion 104, and R2 is the radius of a sliding portion 106a of the spring bracket member 106 that comes in contact with the inner circumference 103a of the rearview mirror main body 103. Since R2 is smaller in comparison with R1, the pressing force generated by the spring 107 is not uniformly applied to the spherically convex portion 104.

Figure 5B:
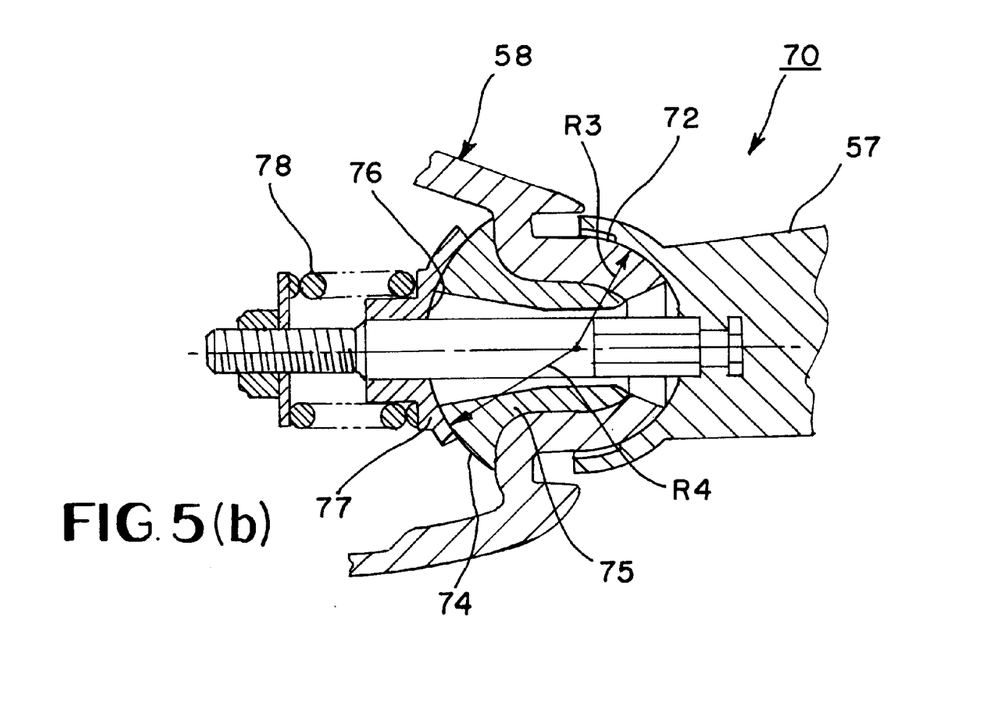
FIG. 5(b) is a cross sectional view illustrating the connection between the mirror main body and the mirror stay of the rearview mirror supporting structure according to the present invention, when the mirror main body is in a non-tilted condition relative to the mirror stay.

FIG. 5(b) illustrates the present invention's rearview mirror main body supporting structure 70. R3 is the inner radius of the spherically convex portion 72, and R4 is the radius of the spherically convex surface 74. Since R4 is larger in comparison with R3, the pressing force generated by the spring 78 is uniformly applied to the spherically convex portion 72.

Further, since the spherically concave surface 76 of the spring seat 77 is brought into sliding contact with the spherically convex surface 74 of the spring bracket member 75, the spherically convex surface 74 serving as the spring bracket surface can be held in a stable state. In other words, the increased surface area of contact between the spherically convex surface 74 and spherically concave surface 76 leads to a stable relationship. By distinction, in the background art, the related surface area of contact is defined by the portions of the spring 107 which bear against the spring bracket member 106. Such a limited area of contact leads to an unstable relationship between the mirror stay 100 and the rearview mirror main body 103.

Figure 6A:
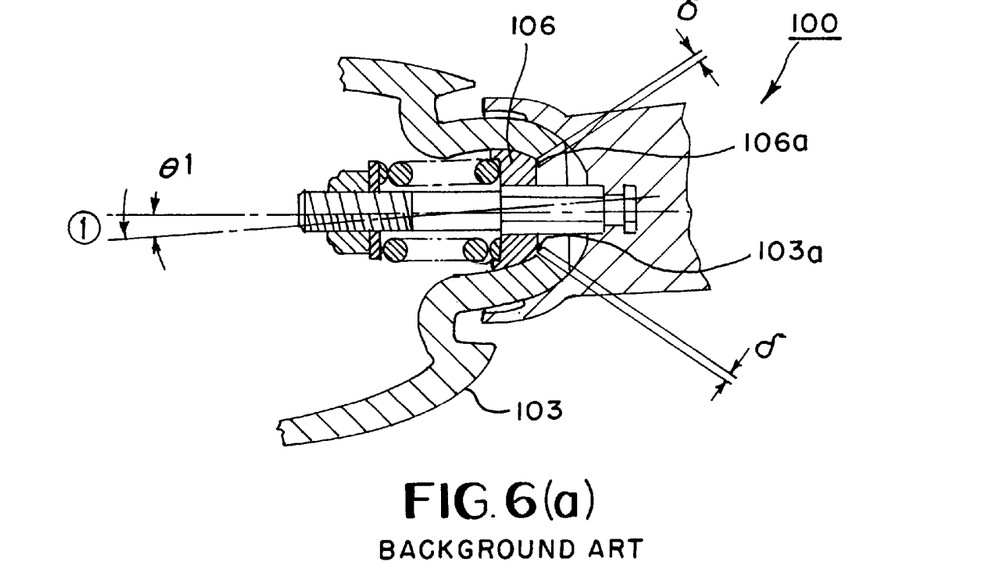
FIG. 6(a) is a cross sectional view illustrating the connection between the mirror main body and the mirror stay of the rearview mirror supporting structure according to the background art, when the mirror main body is in a tilted condition relative to the mirror stay.

FIG. 6(a) illustrates the background art's rearview mirror main body supporting structure 100, with the rearview mirror main body 103 titled at an angle of θ1. As shown, when the rearview mirror main body 103 is titled in a direction indicated by an arrow (1), a couple of positional shifts δ result. The shifts δ reduce the area of contact between the sliding portion 106a of the spring bracket member 106 and the inner circumference 103a of the rearview mirror main body 103.

As a result, the rearview mirror main body 103 is prone to vibrate. In addition, when the rearview mirror main body 103 is adjusted at an angle such as θ1, rattles can occur. The greater the angle θ1 of the rearview mirror main body 103, the greater the risk of vibrations and rattles since the contact is even more reduced.

Figure 6B:
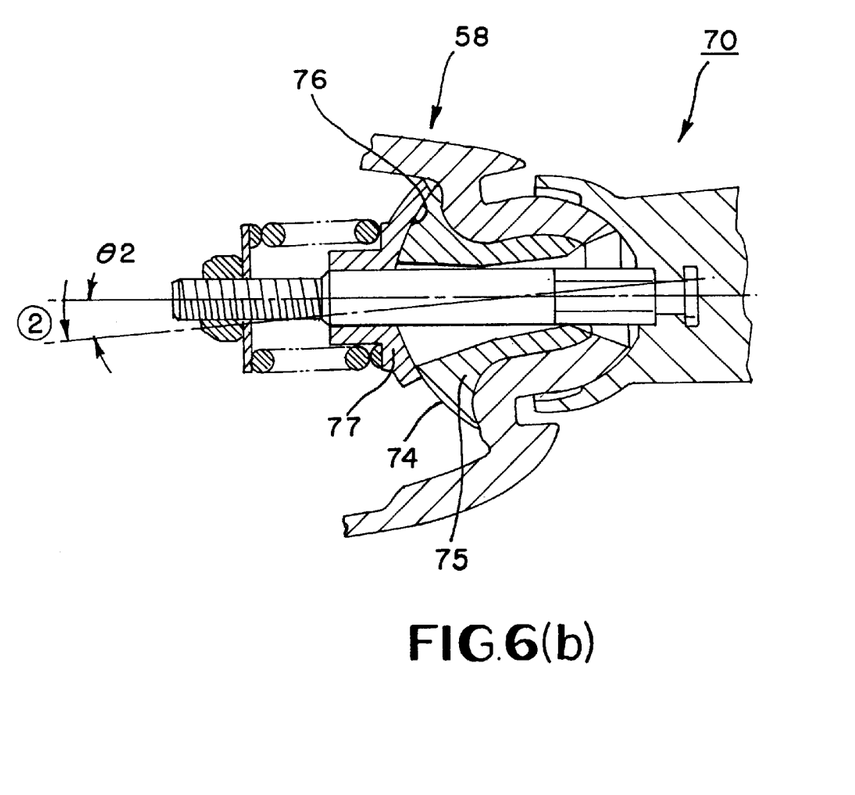
FIG. 6(b) is a cross sectional view illustrating the connection between the mirror main body and the mirror stay of the rearview mirror supporting structure according to the present invention, when the mirror main body is in a tilted condition relative to the mirror stay.

FIG. 6(b) illustrates the present invention's rearview mirror main body supporting structure 70, with the rearview mirror main body 58 titled at an angle of θ2. As shown, even if the rearview mirror main body 58 is tilted in a direction indicated by an arrow (2), the area of the contact surface between the spherically concave surface 76 of the spring seat 77 and the spherically convex surface 74 of the spring bracket member 75 does not change. By the present invention's arrangement, the rearview mirror main body 58 can be held in a stable state over a wide range of tilt angles θ2. As a result, the rearview mirror main body 58 is substantially less prone to vibrate or rattle.

Further, due to the arrangement of the spring bracket member 75 and spring seat 77, according to the present invention, the range of possible angles of rotation θ2 is relatively greater than the range of possible angles of rotation θ1, of the rearview mirror supporting structure 100, according to the background art.

Since the surfaces 74 and 76 are matching spherical surfaces, the pressure of the spring 78 is applied to the spring seat 77 uniformly, without regard to the rotational position of the rearview mirror main body 58. This uniform pressure against the spring seat 77 also serves to lessen the chances of vibration and rattling in the rearview mirror main body 58. Also, since the spherically convex surface 74 of the spring bracket member 75 is made of resin, the spherically concave surface 76 of the spring seat 77 slides smoothly thereon. The combination of smooth sliding and uniform spring pressure results in a rearview mirror which can be smoothly adjusted by using a uniform application of torque.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for supporting a rearview mirror comprising:
   a first member;
   a concave portion provided on said first member;
   a second member;
   a convex portion provided on said second member, said convex portion engaging said concave portion;
   a first hole formed in said convex portion;
   a bracket located inside said convex portion;
   a second hole formed in said bracket;
   an extension extending from said concave portion and passing through said first hole and said second hole;
   a biasing device engaged to said extension;
   a seat adapted to slidingly engage against said bracket, said biasing device causing said seat to bear against said bracket and causing said convex portion to bear against said concave portion; and
   a concave surface formed on said seat in an area adapted to slidingly engage against said bracket.

2. The apparatus according to claim 1, further comprising:
   a convex surface formed on said bracket in an area adapted to slidingly engage against said seat.

3. The apparatus according to claim 2, wherein said convex surface has a radius of curvature R1, said concave portion has a radius of curvature R2, and R1 is greater than or equal to R2.

4. The apparatus according to claim 1, wherein said concave surface has a radius of curvature R1, said concave portion has a radius of curvature R2, and R1 is greater than or equal to R2.

5. The apparatus according to claim 4, further comprising:
   a convex surface formed on said bracket in the area adapted to slidingly engage against said seat.

6. The apparatus according to claim 5, wherein said convex surface has a radius of curvature R1, said concave surface has a radius of curvature R2, said concave portion has a radius of curvature R3, and R1=R2, and R1 is greater than or equal to R3.

7. The apparatus according to claim 1, wherein said first member is a stay for attachment to a vehicle and said second member is a housing for a rearview mirror.

8. The apparatus according to claim 1, wherein said biasing device is a spring.

9. The apparatus according to claim 8, wherein said extension is a bolt.

10. The apparatus according to claim 9, further comprising:
    a spring stop engaged to said bolt, said spring exerting a biasing force between said spring stop and said seat.

11. The apparatus according to claim 10, further comprising:
    a nut threadably engaged with said bolt, and wherein said spring stop encircles said bolt adjacent said nut, and said nut can be adjustably threaded onto said bolt to adjust the biasing force between said spring stop and said seat.

12. The apparatus according to claim 1, wherein said bracket is formed separately from said second member.

13. The apparatus according to claim 12, wherein said bracket is formed of resin.

14. The apparatus according to claim 13, wherein said seat is die-cast.

15. The apparatus according to claim 1, wherein said concave portion is a spherically concave portion and said convex portion is a spherically convex portion.

16. An apparatus for supporting a rearview mirror comprising:
    a stay for attachment to a vehicle;
    a concave portion formed in said stay;
    a housing for a rearview mirror;
    a convex portion attached to said housing, said convex portion having a radius of curvature which is equal to a radius of curvature of said concave portion, and said convex portion engaging said concave portion;
    a first hole formed in said convex portion;
    a spring bracket located inside said convex portion;
    a second hole formed in said spring bracket;
    a bolt extending from said concave portion and passing through said first hole and said second hole;
    a spring encircling said bolt;
    a spring seat adapted to slidingly engage against said spring bracket, said spring pressing against said spring seat causing said spring seat to bear against said spring bracket and causing said convex portion to bear against said concave portion; and
    a concave surface formed on said spring seat in an area adapted to slidingly engage against said spring bracket.

17. The apparatus according to claim 16, wherein said concave portion is a spherically concave portion and said convex portion is a spherically convex portion.

18. An apparatus for supporting a rearview mirror comprising:
    a first member;
    a guide formed in said first member;
    a bushing disposed in said guide, wherein said bushing includes three concentric layers in the form of an inner pipe, an elastic liner, and an outer pipe;
    a second member;
    a concave portion formed in said second member, said first member being located inside said concave portion;
    a fixing device passing through said bushing and connecting to said first member to said second member.

19. The apparatus according to claim 18, wherein said first member is a stay for attachment to a rearview mirror, and said second member is a base for attachment to a vehicle.

20. The apparatus according to claim 19, further comprising:
    a fairing stay, said base being connected to said fairing stay; and
    a vibration dampener mounted to said fairing stay, said vibration damper comprising two elastic members attached to the fairing stay, and a weight attached between the two elastic members.

* * * * *